(12) United States Patent
Manneschi

(10) Patent No.: US 11,150,340 B2
(45) Date of Patent: Oct. 19, 2021

(54) DEVICE AND METHOD FOR INSPECTION OF THE LEG OF AN INDIVIDUAL TO DETECT THE CARRYING OF FRAUDULENT OBJECTS

(71) Applicant: Alessandro Manneschi, Arezzo (IT)

(72) Inventor: Alessandro Manneschi, Arezzo (IT)

(73) Assignee: Alessandro Manneschi

( * ) Notice: Subject to any disclaimer, the term of this patent is extended or adjusted under 35 U.S.C. 154(b) by 203 days.

(21) Appl. No.: 16/158,913

(22) Filed: Oct. 12, 2018

(65) Prior Publication Data
US 2019/0113614 A1    Apr. 18, 2019

(30) Foreign Application Priority Data

Oct. 13, 2017   (FR) ...................................... 1759602

(51) Int. Cl.
| | | |
|---|---|---|
| *G01S 13/88* | (2006.01) | |
| *G01V 3/12* | (2006.01) | |
| *G01S 7/03* | (2006.01) | |
| *G01S 7/41* | (2006.01) | |
| *G01V 8/00* | (2006.01) | |

(52) U.S. Cl.
CPC ............ *G01S 13/887* (2013.01); *G01S 7/032* (2013.01); *G01S 7/412* (2013.01); *G01V 3/12* (2013.01); *G01V 8/005* (2013.01)

(58) Field of Classification Search
CPC ........ G01S 13/887; G01S 13/89; G01S 7/032; G01S 7/412; G01V 3/12; G01V 8/005
USPC .......................................................... 342/22
See application file for complete search history.

(56) References Cited

U.S. PATENT DOCUMENTS

| | | | |
|---|---|---|---|
| 8,531,915 B2* | 9/2013 | Ammar | G01S 15/04 367/93 |
| 2004/0140924 A1* | 7/2004 | Keller | G01V 8/005 324/642 |
| 2004/0255695 A1* | 12/2004 | Gysling | G01F 1/74 73/862 |
| 2005/0116825 A1 | 6/2005 | Manneschi | |

(Continued)

FOREIGN PATENT DOCUMENTS

| | | |
|---|---|---|
| EP | 1574879 A1 | 9/2005 |
| FR | 2860631 A1 | 4/2005 |

(Continued)

OTHER PUBLICATIONS

French Search Report for Application No. FR1759602 dated Jun. 21, 2018.

*Primary Examiner* — Erin F Heard
*Assistant Examiner* — Michael W Justice

(57) ABSTRACT

The invention relates to a device adapted to inspect the leg of an individual, and comprises a support base (110) adapted to receive a foot of an individual, two lateral panels (120) adapted to be placed on either side of the leg of an individual, positioning means (112, 114, 142) of the foot and of the leg relative to the support base (110) and to the panels (120), microwave receiver/sender transducer means (200) arranged on each lateral panel (120) opposite the lateral panel which is facing it, and analysis means (300) of signals detected on the microwave receivers (200) corresponding to the signals transmitted from a panel (120) to the opposite panel and to the signals reflected from a panel (120) towards this same panel.

19 Claims, 6 Drawing Sheets

(56) References Cited

U.S. PATENT DOCUMENTS

| | | | |
|---|---|---|---|
| 2007/0073492 A1* | 3/2007 | Manneschi | G01V 3/12 |
| | | | 702/25 |
| 2007/0211922 A1* | 9/2007 | Crowley | G07C 9/38 |
| | | | 382/115 |
| 2008/0164420 A1 | 7/2008 | Manneschi | |
| 2014/0320331 A1 | 10/2014 | Fernandes et al. | |
| 2015/0253422 A1* | 9/2015 | Morton | G01V 8/005 |
| | | | 324/642 |
| 2017/0343666 A1 | 11/2017 | Manneschi | |
| 2018/0313948 A1 | 11/2018 | Manneschi | |

FOREIGN PATENT DOCUMENTS

| | | |
|---|---|---|
| FR | 2889338 A1 | 2/2007 |
| FR | 2911212 A1 | 7/2008 |
| FR | 3050283 A1 | 10/2017 |
| FR | 3050284 A1 | 10/2017 |
| FR | 3050285 A1 | 10/2017 |
| WO | 2007027827 A2 | 3/2007 |

* cited by examiner

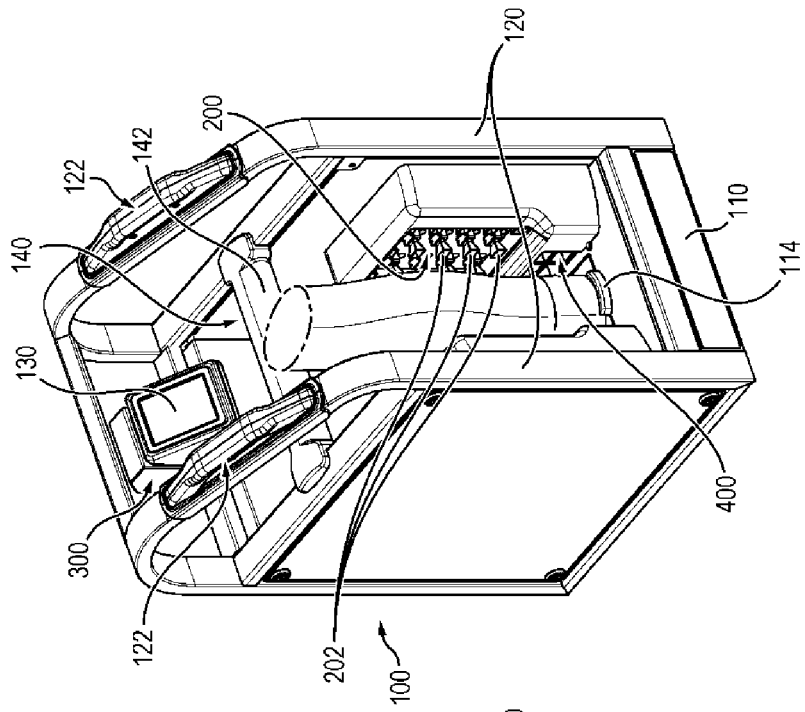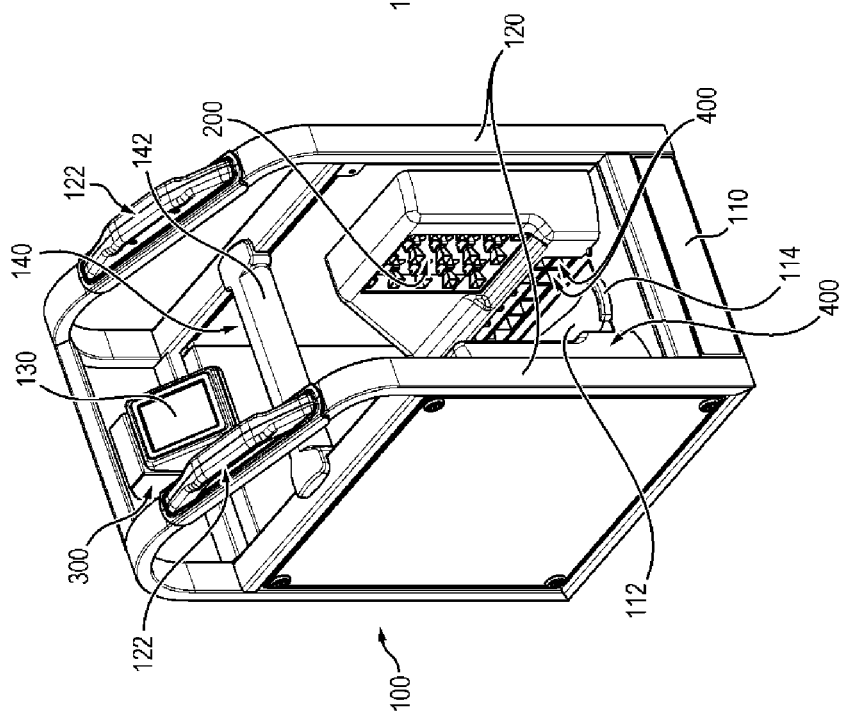

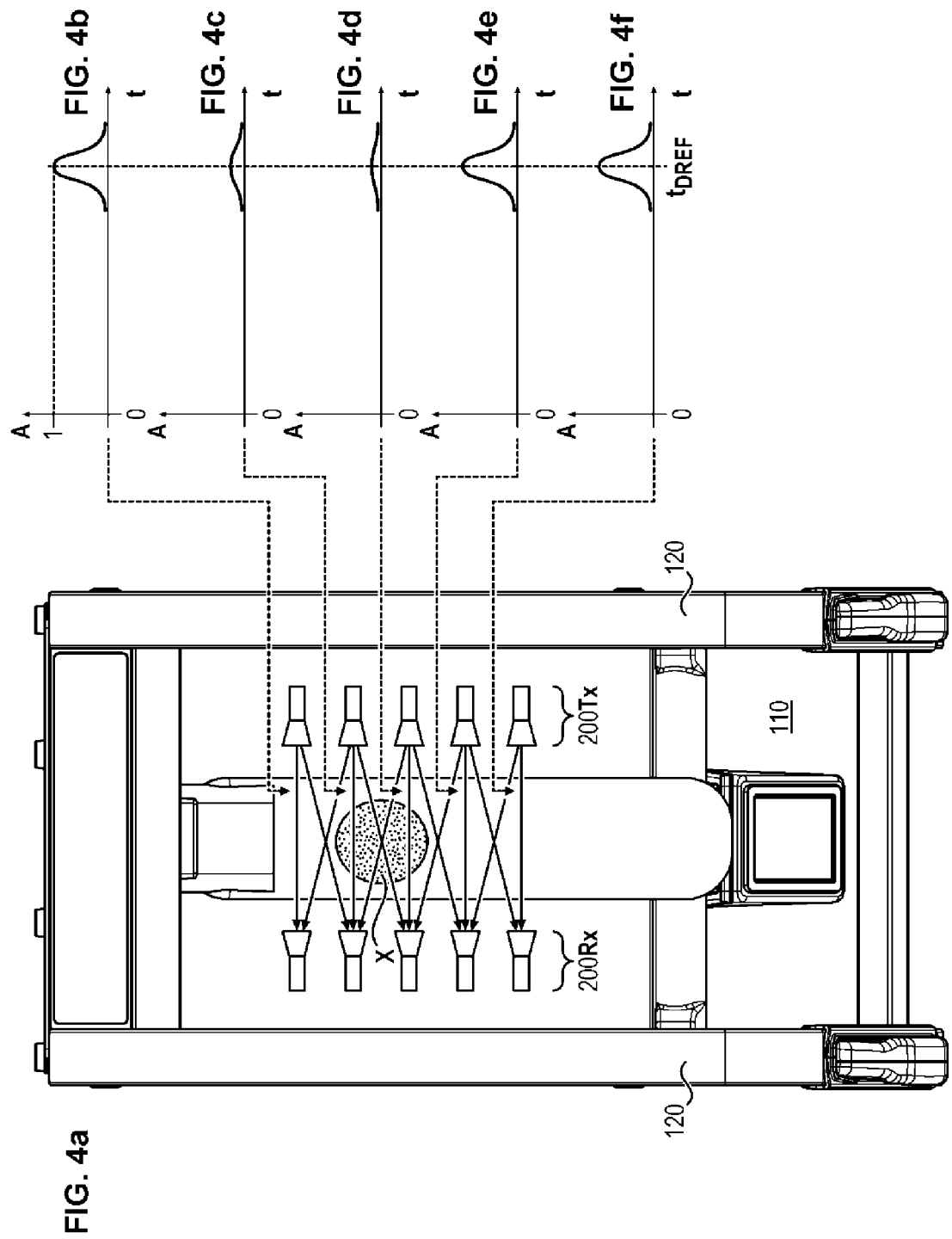

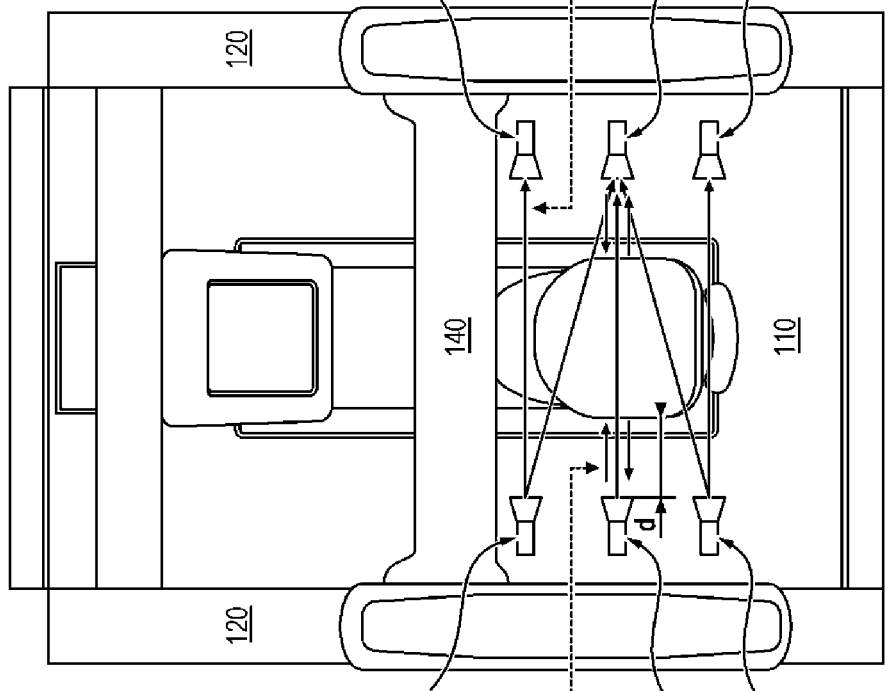

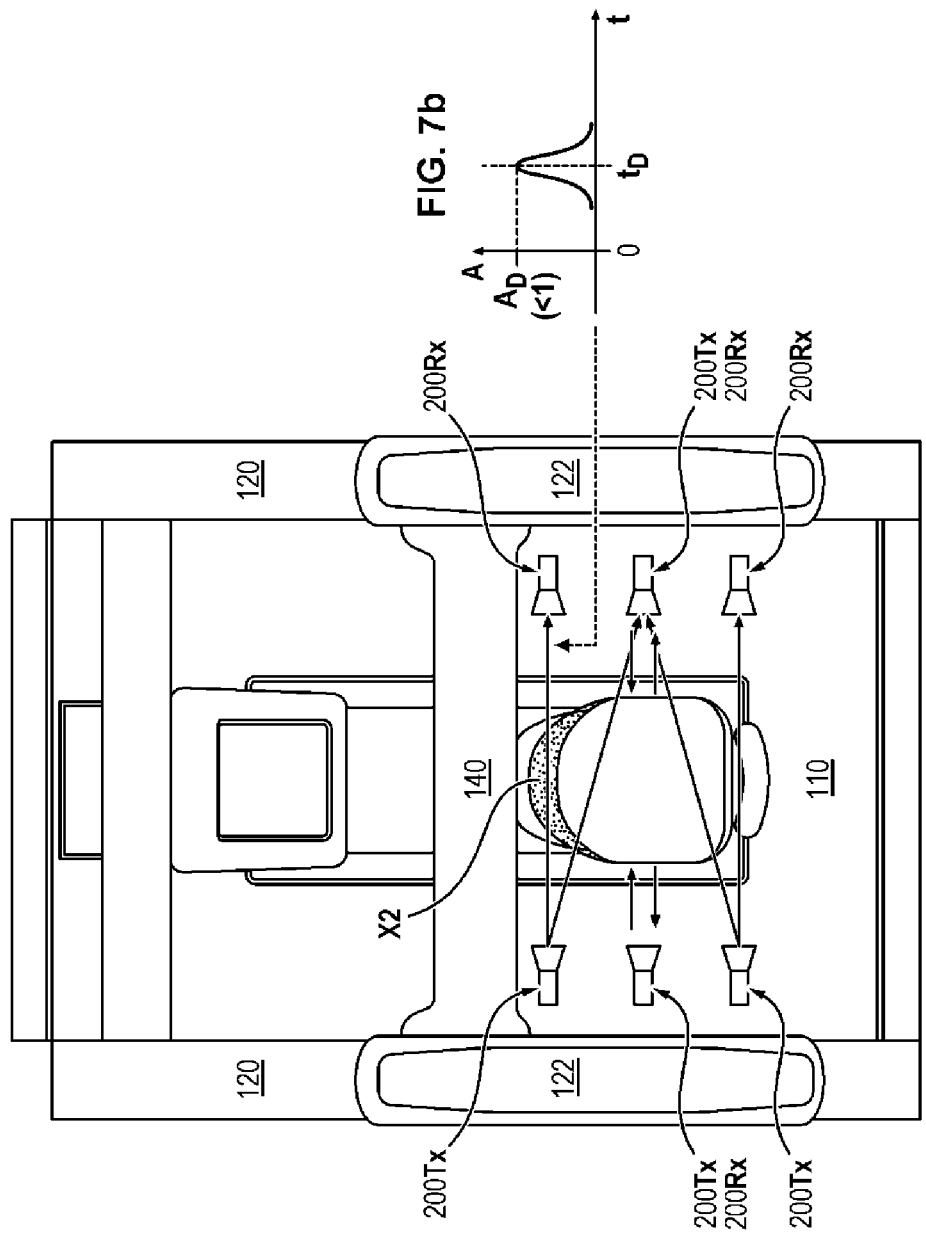

DEVICE AND METHOD FOR INSPECTION OF THE LEG OF AN INDIVIDUAL TO DETECT THE CARRYING OF FRAUDULENT OBJECTS

CROSS REFERENCE TO RELATED APPLICATIONS

The present application claims priority from French Patent Application 1759602 filed on Oct. 13, 2017, the disclosure of which is hereby incorporated herein by reference.

FIELD OF THE INVENTION

The present invention relates to the field of detectors designed for detection of objects or materials not authorised in a protected access zone.

TECHNOLOGICAL BACKGROUND

Today it seems necessary to highly reliably control attempts to introduce or take out specific products, for example but not exclusively explosive materials, in or outside a sensitive zone.

The problem raised here covers a very wide range of situations, which encompasses especially and non-limiting the attempt to introduce products to a protected zone, such as a shop, school, train station, a public or even private body, or the attempt to take products outside a defined perimeter, for example in the event of company theft or at a protected site.

For several years, body scanners have been developed to detect arms, explosives, etc. hidden under clothing of individuals entering a protected zone. All these systems utilize technologies based on the detection of radiation energies modulated or emitted by the body of the inspected individuals. Radiation energies used in this way include X-rays, microwaves, millimetric waves, infrared light, terahertz waves and ultrasound.

Despite the use of several types of radiation energies and imaging geometries, the principle of all these body scanners is the creation of an electronic image of the individual on which the clothing of the individual is transparent. This image is then displayed on a monitor and viewed by an operator so that the latter determines whether the individual is carrying a target object. For this, the operator, who is trained in detection of target objects, must be capable of determining if those objects identified by the body scanner correspond to the human anatomy, to an authorized object such as a lighter, a handkerchief or other pieces, or to a target object such as a weapon or an explosive.

It eventuates these days that individuals who try to fraudulently bring a product outside a protected zone or who try to introduce such a product, often use shoes to conceal the product in question. This phenomenon essentially seems due to the fact that this zone is difficult to control visually or by manual touch.

Yet it seems that conventional body scanners are incapable of detecting such products. On the one hand, detection by body scanners is parasited by noise generated by the infrastructures on the floor. Therefore, body scanners generally analyse only that part of an individual located at a certain distance above the floor. On the other hand, conventional body scanners are limited in their detection due to the thickness of the upper of the shoe or boot which forms a shield and, on the basis of current technologies does not determine the shape of the foot and therefore identify target objects.

This is why it happens that operators require individuals wanting to enter or exit a sensitive zone to take their shoes off, in an attempt to improve inspection. Such a request imposes severe restrictions and discomfort.

The applicant has therefore proposed devices which comprise a frame which comprises a support base formed by a rectangular board in the form of a step whereof the plane upper surface comprises a design or print and a stop intended to receive and position a single foot of an individual covered by a shoe, two symmetrical lateral panels which house detection means, and an information module.

Examples of this device are disclosed in documents FR 2860631, EP 1574879, FR 2889338 and FR 2911212.

The detection means described in the documents mentioned can be formed by windings for detection of metals, sampling means, for example in the form of suction nozzles, for drawing off steam or traces of particles, for example drugs or explosives, analysis means based on nuclear magnetic resonance comprising for example Helmholtz coils, or again complex impedance analysis means or radioactive radiation detectors.

SUMMARY OF THE INVENTION

An aim of the invention is to propose novel detection means for improving the detection of target objects likely to be camouflaged in a shoe or on the leg of an individual.

An aim of the invention in particular is to propose detection means which are effective irrespective of where a fraudulent object is fixed on the leg of an individual, more precisely on the calf (whether on the front, the rear, an external lateral part or an internal lateral part of the leg, or even a combination of these arrangements).

These aims are attained according to the invention by way of a device adapted to inspect the leg of an individual, which comprises:
  a support base adapted to receive a foot of an individual,
  two lateral panels adapted to be placed on either side of the leg of an individual,
  positioning means of the foot and of the leg relative to the support base and to the panels,
  microwave receiver/sender means arranged on each lateral panel opposite the lateral panel which is facing it, and
  analysis means of signals detected on the microwave receivers corresponding to the signals transmitted from a panel to the opposite panel and to the signals reflected from a panel towards this same panel.

The invention also relates to a method for detection of fraudulent objects carried by the leg of an individual by means of the above device.

BRIEF DESCRIPTION OF THE DRAWINGS

Other characteristics, aims and advantages of the present invention will emerge more clearly from the following detailed description and with respect to the appended drawings given by way of non-limiting examples and in which:

FIG. 1 illustrates a perspective view of a device according to the present invention, FIG. 2 illustrates the same device by schematically illustrating the positioning of the lower part of a leg of an individual in the device.

DETAILED DESCRIPTION OF AN EMBODIMENT

Figure 3:
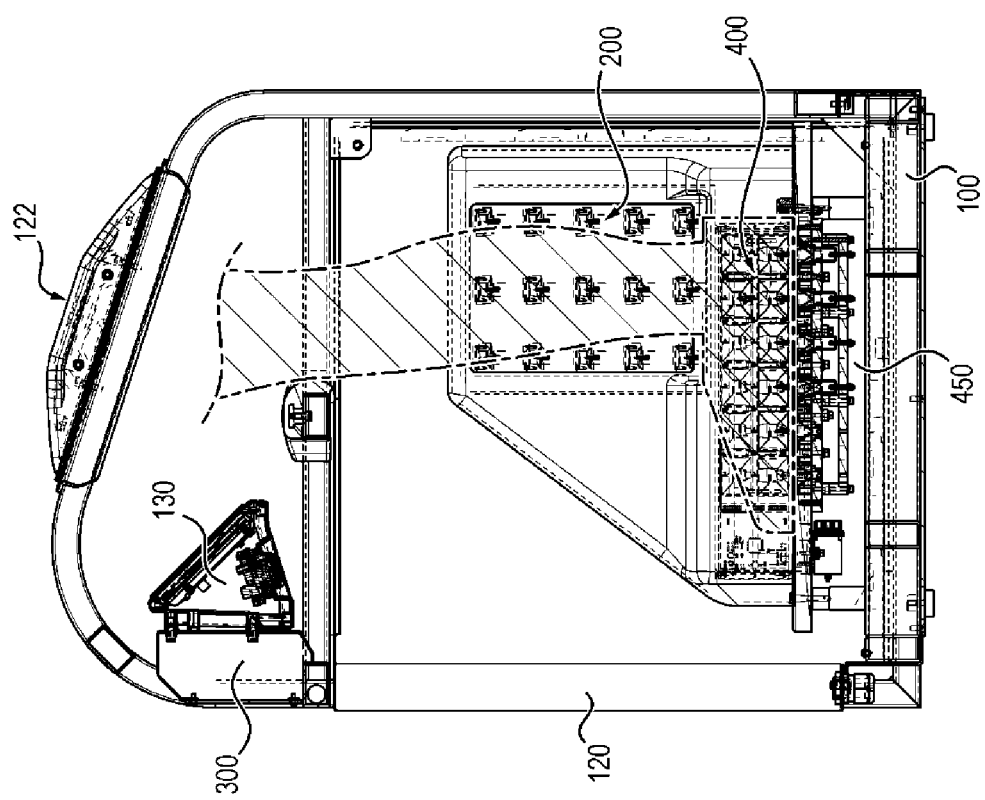
FIG. 3 illustrates a schematic view in longitudinal vertical section of the device according to the present invention, FIG. 4a schematically illustrates, in a lateral view, microwave emissions from a panel in the direction of the opposite panel with an object non-permeable to the microwave interposed between the two panels and FIGS. 4b, 4c, 4d, 4e, 4f, schematically illustrate the signals received at the receivers on the second panel as a function of their positioning relative to said object, FIG. 5a schematically illustrates, in a plan view, microwave emissions/receptions in the case of a leg interposed between the two panels, and FIGS. 5b and 5c schematically illustrate respectively a signal transmitted out of the zone of the leg without delay and without attenuation and a signal reflected by the leg, FIG. 6a schematically illustrates in a plan view the microwave emissions/receptions in the case of a leg interposed between the two panels and carrying laterally a fraudulent object and FIG. 6b schematically illustrates the signal reflected by this object, and FIG. 7a schematically illustrates in a plan view the microwave emissions/receptions in the case of a leg interposed between the two panels and carrying on the front a fraudulent object and FIG. 7b schematically illustrates the signal transmitted via this object characterized by a specific time delay and attenuation.

The attached figures illustrate a device according to the present invention comprising a frame 100 which comprises:
- a support base 110 adapted to receive a foot of an individual and formed by a rectangular board in the form of a step whereof the plane upper surface comprises preferably a design or marking 112 and a stop 114 intended to receive and position a single foot of an individual covered by a shoe,
- two lateral symmetrical panels 120 adapted to be placed on either side of the leg of an individual and which house detection means, and
- an information module 130.

The device shown in the attached figures can be compliant as to its geometry, its dimensions, the route of the positioning marker 112, of the stop 114, the nature of messages displayed on the module 130, the dispositions described in the abovementioned documents FR 2860631, EP 1574879, FR 2889338 and FR 2911212.

More precisely according to the invention, as indicated previously, it also comprises:
- positioning means 140 of the knee of an individual, relative to the support base 110 and aux panels 120,
- microwave receiver/sender means 200 arranged on each lateral panel 120 opposite the lateral panel which is facing it, and
- analysis means 300 of signals detected on the microwave receivers corresponding to the signals transmitted from a panel 120 to the opposite panel and to the signals reflected from a panel 120 towards this same panel.

The positioning means 140 of the knee are formed preferably from a cross-beam 142 connecting the internal faces of the two lateral panels 120 at a height of the order of 40 cm.

The microwave receiver/sender means 200 preferably comprise several microwave transducers arranged according to a matrix of horizontal lines and vertical columns on each panel 120. As shown in FIGS. 1, 2 and 3, five horizontal rows each comprising three microwave transducers are preferably provided.

By way of non-limiting examples, the horizontal gap between two transducers 200 of a row is of the order of 75 mm, the vertical gap between two rows of transducers 200 is of the order of 55 mm, the highest row of transducers 200 is located at a height of the order of 350 mm above the surface of the support base 110.

Preferably, each transducer microwave 200 is associated with a focus cone 202. The output of each focus cone 202 is preferably located at approximately 130 mm of the vertical median plane of the device.

The transducers 200 preferably operate in a range of frequencies between 5 and 30 GHz and very preferably between 12 and 20 GHz.

The different transducers 200 located on a panel 120, for example the fifteen transducers distributed in five vertical rows of three transducers, are located respectively coaxially to a transducer located opposite on the opposite panel 120.

Under the control of the means 300 each transducer 200 can work alternatively as sender or receiver or as sender and receiver.

Each sender 200 is preferably adapted to emit in the direction of a coaxial receiver 200 on the opposite panel 120, as well as in the direction of the transducers adjacent to this opposite coaxial transducer 200.

Similarly, each receiver 200 is preferably adapted to receive from a coaxial sender 200 located on the opposite panel 120, as well as from the transducers adjacent to this opposite coaxial transducer sender 200.

As evident in FIG. 4, when an object X composed of a substance non-permeable to microwaves is carried by the calf of an individual located opposite the transducer matrix 200, the beams transmitted between a sender 200 located on a first panel 120 in the direction of one or more receivers 200 located on the opposite second panel 120 which are not hidden by the object X arrive at the receivers with a slight delay due to transmission in the air, without noticeable attenuation in amplitude (FIGS. 4b, 4e and 4f).

However, the beams sent by a sender 200 in the direction of the object X are stopped by the latter and do not reach the opposite receiver 200 (FIGS. 4c and 4d).

Controlling the sender/receiver couples 200 and analysis of signals originating from a receiver 200 therefore detects the presence on the leg of an individual of an object X non-permeable to microwaves.

As is evident in FIG. 5, due to its water density the leg of an individual almost fully reflects microwaves.

In this way, the beams transmitted between a sender 200 located on a first panel 120 in the direction of one or more receivers 200 located on the second opposite panel 120 which are not hidden by the leg once again arrive at the opposite receivers, almost without delay and without noticeable attenuation in amplitude (FIG. 5b).

However, the beams sent by a sender 200 in the direction of the leg are reflected by the leg in the direction of the sender functioning as receiver with a delay equal to 2*d/c, d representing the distance between the sender and the leg and c representing the swiftness of microwaves in the air (FIG. 5c).

Figure 6A:
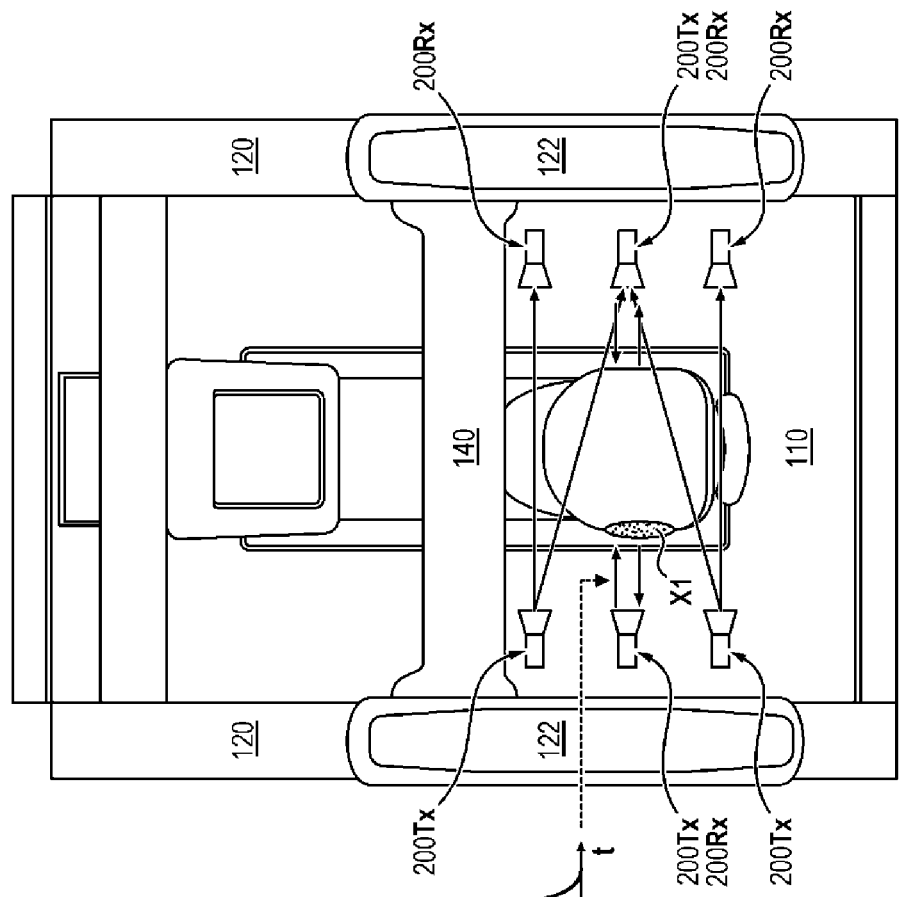

FIG. 6 represent the operation of the device for detection of a fraudulent object X1 carried laterally on the calf of an individual.

Here too, the beams transmitted between a sender 200 located on a first panel 120 in the direction of one or more receivers 200 located on the second opposite panel 120 which are not hidden by the leg arrive at the opposite receivers, almost without delay and without noticeable attenuation in amplitude, as shown in FIG. 5b.

Figure 6B:
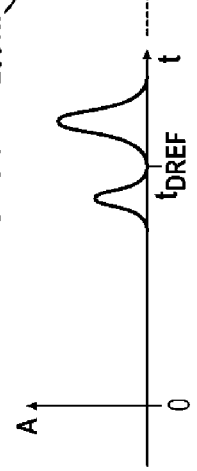

However, the beams sent by a sender 200 in the direction of the object X1 are reflected on the one hand by the external face of the object X1 and on the other hand by the leg in the direction of the sender operating as receiver, as shown in FIG. 6b.

As shown in FIG. 6b, in this case the receiver 200 receives two successive echoes, with different delay times: a first echo due to reflection on the substance X1 and a second echo due to reflection on the leg.

In general, according to tests conducted by the inventors, the second echo on the leg has a bigger amplitude than the first echo on the substance X1 which is reflective partly only.

The analysis compared of the signals of the type illustrated in FIGS. 5b, 5c and 6b, by comparison detects a fraudulent object carried laterally on the calf of an individual.

FIG. 7 represent the operation of the device for detection of a fraudulent object X2 carried on the front of the calf of an individual.

Here too, the beams transmitted between a sender 200 located on a first panel 120 in the direction of one or more receivers 200 located on the opposite second panel 120 which are not hidden by the leg arrive on the opposite receivers, almost without delay and without noticeable attenuation in amplitude, as shown in FIG. 5b.

However, the beams sent by a sender 200 in the direction of the object X2 without being hidden by the leg are transmitted with delay and attenuation due to the substance X2 to the opposite receiver located on the opposite panel.

The analysis compared of the signals of the type illustrated in FIGS. 5b, 5c and 7b, by comparison detects a fraudulent object carried on the front (same for the rear) of the calf of an individual.

The skilled person will understand from reading the above description that the invention enables detection of non-metallic fraudulent substances, for example explosives or drugs, carried by the lower leg of an individual by detection of the delay and amplitude of microwave signals transmitted through the substance and/or reflected by the substance, as well as by the leg.

Preferably, the matrix of transducers 200 is adapted to cover the entire lower part of the leg between the ankle and the knee and the analysis means 300 undertake comparison of signals transmitted and/or reflected with transmission values in the air and/or signals reflected on a leg having no fraudulent object.

The means 300 are adapted to generate an alarm when a significant gap exceeding a threshold is detected relative to the reference values.

The positioning of the leg on the marking 112 and of proper positioning of the knee supported on the cross-beam 142 can be controlled by adapted optical cells placed on the panels 120.

Preferably, in terms of the invention, the means 300 are adapted to perform at least one of the following steps and preferably the combination of all the following steps:

measuring the delay and amplitude of direct transmission of microwaves between each pair of coaxial senders 200Tx and receiver 200Rx located on the two opposite panels 120, measuring the delay and amplitude of oblique transmission of microwaves between each sender 200Tx located on a panel 120 and the receivers 200Rx which enclose the receiver located on the opposite coaxial panel 120 of the sender, measuring the delay and amplitude of the microwave wave emitted by each transducer sender 200Tx and reflected towards the same transducer forming a receiver 200Rx or towards the receivers 200Rx enclosing the latter, by a leg or by a fraudulent substance (non-metallic) placed on or around the leg, detection of the presence of a double echo of microwave waves reflected by a fraudulent substance and by the leg, comparison of microwave waves transmitted directly with a transmission reference value in a void and transmission of an alarm in case of detection of delay greater than a threshold and with an amplitude corresponding to a range of substances which delays and attenuates the microwave, comparison of microwave waves transmitted directly with microwaves transmitted on adjacent transducers and generation of an alarm in case of a gap greater than a threshold detected between the different signals (similar to the presence of a non-metallic substance non-permeable to microwaves), comparison of oblique microwave waves with a reference value in a void and generation of an alarm in case of detection of delay greater than a threshold and with an amplitude corresponding to a range predetermined representative of substances which delay and attenuate the microwave, comparison of microwave waves transmitted obliquely with the adjacent microwave waves transmitted directly and generation of an alarm in case of a gap greater than a threshold detected between the different signals (similar to the presence of a non-metallic substance and non-permeable to microwaves), comparison of a double echo detected with transmission values in a void and generation of an alarm in case of detection of a delay greater than a threshold between the peaks of two echoes with an amplitude greater than a threshold (representative of a substance which reflects part of the wave (first echo) and which delays and attenuates the non-reflected signal (second echo)).

The device according to the present invention which has just been described can be completed by auxiliary equipment, for example by means forming a metal detector based on windings integrated into the lateral panels 120 and/or by sampling means and analysis of substances, steam or traces of particles and/or by analysis means of nuclear magnetic resonance type, analysis means of complex impedance and/or detection means of radioactive radiations.

Such means are known per se in their general structure and will therefore will not be described in detail below.

The device according to the present invention described previously can also be completed by the means which will now be described which correspond to the object of patent applications filed in France under numbers FR 1653385, FR 1655726 and FR 1655729 and which can be integrated into the base 110 and/or the lateral panels 120.

Therefore in terms of the invention, the device 100 can comprise:

microwave receiver/sender means 400 (for example in the range 5 GHz-30 GHz, advantageously in the range 12 GHz-20 GHz) preferably integrated into the base of each lateral panel 120 and distributed over the length of the support base 110, (these associated microwave sender means and microwave receiver means placed respectively on either side of the sole of the shoe are advantageously adapted to detecting on receiver means of the signal coming from sender means placed directly opposite and from the signal coming from sender means placed obliquely relative to the receiver means, at the same vertical level or at a different height), means for measuring the width of an element, typically a sole, interposed between these microwave receiver/sender means 400, analysis means 300 of at least one parameter of the transmission time between the microwave receiver/sender means 400 and/or of the amplitude of the signal transmitted between the microwave receiver/sender means 400, and standardization means of the above analysis relative to a size unit of standard width obtained on the basis of the means for measuring width.

The means 300 can also be adapted to analyse the amplitude of the signals originating from the receivers to deduced therefrom information on the thickness of the sole.

These means 400 form at least one microwave sender means placed to one side of the base 110 and at least one microwave receiver means placed on the opposite side of the base 110 such that the microwaves emitted by the microwave sender means pass through the sole of the shoe placed on the front support base 110 to arrive at the associated microwave receiver means placed on the opposite side of the base 110.

The means for measuring the width of the element interposed between the microwave receiver/sender means 400 comprise for example a plurality of infrared sender/receiver means adapted to measure the return propagation time between an infrared sender and the associated infrared receiver.

Several pairs of infrared sender means and associated infrared receiver means can accordingly be provided, placed on each side of the base 110 such that the infrared emitted by each infrared sender means is reflected on the sole of the shoe placed on the front support base 110 to arrive at the associated infrared receiver means placed on the same side of the base 110.

The device can also comprise means, preferably based on microwave and preferably a plurality of such means distributed over the length of the device, adapted to detect stratification by vertical stacking, in the sole, by detection of successive echoes following emission of waves towards the sole.

Standardization means of the signal originating from the detection means of vertical stratification can be provided, on the basis of a signal representative of the estimated height of the sole, The device can also comprise means for measuring the electrical capacity formed by the sole of a shoe placed on the support base 110. Such means can comprise electrodes on handles 122 placed in the upper part of the panels 120. These electrodes formed on the handles 122 are for example made from electrically conductive material embedded in the mass of the panels 120. An electric generator (for example generating voltage between 0.1V and 10V, preferably of the order of 1 volt) is connected in series to the handles 122 provided on lateral panels 120 and electrodes placed on the support base (110), for example electrodes placed on the support base 110 and preferably concentric to cones associated with microwave transducers 450 adapted to generate microwave vertically in a sole.

Of course, the present invention is not limited to the embodiments previously described, but extends to all variants in keeping with its sense.

In particular, the execution of the present invention has been described previously in the context of a device whereof the bases have previously been described in documents FR 2860631, EP 1574879, FR 2889338 and FR 2911212, comprising a support base 10 formed by a step whereof the upper surface comprises a footprint 12 and a stop 14 intended to receive and position a single foot of an individual covered by a shoe.

However the invention is not limited to this particular embodiment. As shown in the attached FIG. 23, the present invention can also apply to devices in which the support base is adapted to simultaneously receive the two feet P of an individual.

In this case, to allow detection respectively and individually on each of the two feet P of an individual under test, it is however preferable to provide protruding on the upper surface of the base three blocks 320, 330 and 340 between which the two feet P must be positioned such that the block central 330 is placed between the two feet P, whereas the two lateral blocks 320 and 340 are arranged respectively on the outside of the feet. The central block 330 contains detection means associated respectively with the blocks 320 and 340 to allow the above different measurements respectively on each of the two feet P. In this way the central block 330 in this case preferably contains senders 142/receivers 144 means for measuring the amplitude of absorption of the microwaves and the propagation time, as well as infrared transducers 152/154 to measure the width of each of the two soles S, separately.

The invention claimed is:

1. An inspection device comprising:
    a support base configured to receive a foot of an individual;
    first and second panels configured to be placed on either side of a leg of the individual, the first and second panels in a fixed configuration relative to the support base;
    a plurality of microwave transducers comprising microwave senders and microwave receivers arranged on the first and second panels, each of the plurality of microwave transducers comprises a central axis, wherein:
        the microwave receivers fixed on the first panel are configured to receive microwave signals generated by the microwave senders arranged on the second panel and microwave signals generated by the microwave senders arranged on the first panel after direct reflection of the microwave signals on the second panel;
        the microwave receivers fixed on the second panel are configured to receive microwave signals generated by the microwave senders arranged on the first panel and microwave signals generated by the microwave senders arranged on the second panel after direct reflection of the microwave signals on the first panel; and
        the central axis of at least one of the microwave transducers of the plurality of transducers arranged on the first panel is coaxial with the central axis of a corresponding microwave transducer of the plurality of microwave transducers arranged on the second panel; and
    analysis means configured to analyse the microwave signals received by the microwave receivers arranged on the first panel which have been generated by the microwave senders arranged on the second panel by the microwave senders arranged on the first panel, and the microwave signals received by the microwave receivers arranged on the second panel which have been generated by the microwave senders arranged on the first panel by the microwave senders arranged on the second panel.

2. The device according to claim 1, wherein the analysis means are configured to analyze a delay and an amplitude of the microwave signals relative to a reference.

3. The device according to claim 1, wherein the analysis means are configured to compare the microwave signals received on a selected microwave receiver of the plurality of transducers with at least one reference signal, wherein the at least one reference signal is selected from (i) a reference signal representative of a transmission in a vacuum, (ii) a reference signal representative of a reflection on a leg.

4. The device according to claim 1, wherein the analysis means are configured to generate an alarm upon detection of a difference greater than a threshold between the microwave signals and the at least one reference signal.

5. The device according to claim 1, wherein the support base further comprises a crossbeam between the internal faces of the first and second panels, the cross-beam configured to position a knee.

6. The device according to claim 1, wherein the plurality of transducers are arranged in a matrix of horizontal lines and vertical columns on each of the first and second panels.

7. The device according to claim 1, wherein the plurality of transducers are aligned along a row on each of the first panel and the second panel.

8. The device according to claim 1, wherein the plurality of transducers are aligned to form at least five horizontal rows, each row comprising at least three microwave transducers.

9. The device according to claim 1, wherein each microwave transducer of the plurality of the microwave transducers is conical.

10. The device according to claim 1, wherein the microwave transducers operate in a frequency range between 5 GHz and 30 GHz.

11. The device according to claim 1, wherein each of the microwave transducers of the plurality of microwave transducers is adapted to work either as a microwave sender or a microwave receiver.

12. The device according to claim 1, wherein each microwave sender is configured to generate the microwave signal directed towards a selected microwave receiver, the selected microwave receiver being coaxial and arranged opposite of the microwave sender, and towards microwave transducers which are adjacent to the selected microwave sender.

13. The device according to claim 1, wherein each microwave receiver is configured to receive the microwave signals from a selected microwave sender arranged opposite the microwave receiver and from microwave transducers which are adjacent to the selected microwave sender.

14. The device according to claim 1, wherein the analysis means are configured to execute at least the one of the following:
   measuring a delay and an amplitude of microwave signals generated by selected microwave senders of the plurality of transducers and received by selected microwave receivers of the plurality of transducers which are coaxial to the selected microwave senders of the plurality of transducers;
   measuring a delay and an amplitude of microwave signals generated by selected microwave senders of the plurality of transducers and received by selected microwave receivers of the plurality of transducers which are not coaxial to the selected microwave senders of the plurality of transducers;
   measuring a delay and an amplitude of the microwave signal emitted by each microwave transducer of the plurality of microwave transducers and reflected towards the same microwave transducer or towards microwave transducers surrounding the same microwave transducer;
   detecting a presence of a double echo of microwave signals reflected by a substance or by the leg;
   comparing the microwave signals with a reference value in a vacuum and generation of an alarm in case of detection of a delay greater than a threshold and with an amplitude corresponding to a range of substances which attenuates microwave signals,
   comparing microwave signals generated by selected microwave senders of the plurality of transducers and received by selected microwave receivers of the plurality of transducers which are coaxial to the selected microwave senders of the plurality of transducers with microwave signals generated by selected microwave senders of the plurality of transducers and received by selected microwave receivers of the plurality of transducers which are not coaxial to the selected microwave senders of the plurality of transducers generation of an alarm if a gap greater than a predetermined threshold is detected between the microwave signals;
   comparing oblique microwave signals with a reference value in a vacuum and generation of an alarm in case of detection of a delay greater than a threshold and with an amplitude corresponding to a range predetermined representative of substances which attenuate the microwave signals; and
   comparing a double echo detected with a reference signal in a vacuum and generation of an alarm in case of detection of a delay greater than a first threshold between peaks of two echoes and with an amplitude greater than a second threshold.

15. An inspection method, the method comprising:
analysing microwave signals detected on microwave receivers from a plurality of transducers, the microwave signals corresponding to signals transmitted from a first panel to a second panel opposite the first panel and to microwave signals reflected from one of the first and second panels towards the one of the first and second panels;
generating an alarm when a gap in a transmission time or in an amplitude of the microwave signals, relative to a reference, is greater than a threshold; and
further comprising at least one of the following:
measuring a delay and an amplitude of microwave signals generated by selected microwave senders of the plurality of transducers and received by selected microwave receivers of the plurality of transducers which are coaxial to the selected microwave senders of the plurality of transducers;
measuring a delay and an amplitude of microwave signals generated by selected microwave senders of the plurality of transducers and received by selected microwave receivers of the plurality of transducers which are not coaxial to the selected microwave senders of the plurality of transducers;
measuring a delay and an amplitude of the microwave signal emitted by each microwave transducer of the plurality of microwave transducers and reflected towards the same microwave transducer or towards microwave transducers surrounding the same microwave transducer;

detecting a presence of a double echo of microwave signals reflected by a substance or by the leg;

comparing the microwave signals with a reference value in a vacuum and generation of an alarm in case of detection of a delay greater than a threshold and with an amplitude corresponding to a range of substances which attenuates microwave signals, comparing microwave signals generated by selected microwave senders of the plurality of transducers and received by selected microwave receivers of the plurality of transducers which are coaxial to the selected microwave senders of the plurality of transducers with microwave signals generated by selected microwave senders of the plurality of transducers and received by selected microwave receivers of the plurality of transducers which are not coaxial to the selected microwave senders of the plurality of transducers generation of an alarm if a gap greater than a predetermined threshold is detected between the microwave signals;

comparing oblique microwave signals with a reference value in a vacuum and generation of an alarm in case of detection of a delay greater than a threshold and with an amplitude corresponding to a range predetermined representative of substances which attenuate the microwave signals; and comparing a double echo detected with a reference signal in a vacuum and generation of an alarm in case of detection of a delay greater than a first threshold between peaks of two echoes and with an amplitude greater than a second threshold.

16. The device according to claim 1, wherein the microwave transducers operate in a frequency range comprised between 12 GHz and 20 GHz.

17. An inspection device comprising:

a support base configured to receive a foot of an individual;

first and second panels configured to be placed on either side of the leg of the individual;

a plurality of microwave transducers comprising microwave senders and microwave receivers arranged on the first and second panels, wherein:

the microwave senders arranged on the first panel are configured to generate microwave signals towards the second panel;

the microwave senders arranged on the second panel are configured to generate microwave signals towards the first panel; and the plurality of transducers are aligned to form at least five horizontal rows, each row comprising at least three microwave transducers, wherein a horizontal gap between two transducers of the at least three transducers is about 75 mm; and wherein the inspection device is configured to generate an alarm based upon detection of a threshold beyond a reference value.

18. The inspection device of claim 17, wherein a vertical gap between two adjacent rows of the at least five horizontal rows is about 55 mm.

19. An inspection device comprising:

a support base configured to receive a foot of an individual;

first and second panels configured to be placed on either side of a leg of the individual;

a plurality of microwave transducers comprising microwave senders and microwave receivers arranged on the first and second panels wherein:

the microwave receivers arranged on the first panel are configured to receive microwave signals generated by the microwave senders arranged on the second panel and microwave signals generated by the microwave senders arranged on the first panel after reflection of the microwave signals on the second panel;

the microwave receivers arranged on the second panel are configured to receive microwave signals generated by the microwave senders arranged on the first panel and microwave signals generated by the microwave senders arranged on the second panel after reflection of the microwave signals on the first panel; and at least part of the microwave transducers of the plurality of transducers arranged on the first panel are coaxial with microwave transducers of the plurality of microwave transducers arranged on the second panel;

wherein, the plurality of transducers are arranged in a matrix of horizontal lines and vertical columns on each of the first and second panels.

* * * * *